(12) United States Patent
Yoeda

(10) Patent No.: US 8,266,947 B2
(45) Date of Patent: Sep. 18, 2012

(54) CETANE NUMBER ESTIMATING APPARATUS AND METHOD

(75) Inventor: Keiji Yoeda, Numazu (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 427 days.

(21) Appl. No.: 12/601,712

(22) PCT Filed: May 28, 2008

(86) PCT No.: PCT/JP2008/059831
§ 371 (c)(1),
(2), (4) Date: Jan. 15, 2010

(87) PCT Pub. No.: WO2008/146852
PCT Pub. Date: Dec. 4, 2008

(65) Prior Publication Data
US 2010/0162805 A1    Jul. 1, 2010

(30) Foreign Application Priority Data

May 28, 2007   (JP) ................................. 2007-140545

(51) Int. Cl.
*G01M 15/05* (2006.01)
(52) U.S. Cl. .................................... 73/35.02; 73/114.55
(58) Field of Classification Search ................ 73/35.02, 73/114.38, 114.52, 114.55
See application file for complete search history.

(56) References Cited

U.S. PATENT DOCUMENTS

| | | | | |
|---|---|---|---|---|
| 6,609,413 B1 * | 8/2003 | De Craecker | ................ | 73/35.02 |
| 7,421,884 B2 * | 9/2008 | Aoyama | ..................... | 73/35.02 |
| 8,042,517 B2 * | 10/2011 | Nakajima | ................. | 123/406.41 |
| 2007/0079647 A1 * | 4/2007 | Aoyama | ..................... | 73/35.02 |
| 2007/0084435 A1 * | 4/2007 | Yamaguchi et al. | .......... | 123/299 |
| 2010/0030453 A1 * | 2/2010 | Takahashi et al. | ............ | 701/104 |
| 2010/0191440 A1 * | 7/2010 | Iwatani | ........................ | 701/103 |
| 2010/0319444 A1 * | 12/2010 | Miyaura et al. | ............ | 73/114.49 |
| 2011/0209533 A1 * | 9/2011 | Yasuda | ....................... | 73/114.16 |

FOREIGN PATENT DOCUMENTS

| | | |
|---|---|---|
| JP | 11-107771 A | 4/1999 |
| JP | 2005-320872 A | 11/2005 |
| JP | 2005-344557 A | 12/2005 |
| JP | 2006-016994 A | 1/2006 |
| JP | 2006-183581 A | 7/2006 |
| JP | 2006-226188 A | 8/2006 |
| JP | 2007-064033 A | 3/2007 |
| JP | 2008-261126 A | 10/2008 |
| JP | 2008-291811 A | 12/2008 |

* cited by examiner

Primary Examiner — Eric S McCall

(74) Attorney, Agent, or Firm — Sughrue Mion, PLLC

(57) ABSTRACT

A cetane number estimating device (1) comprises cylinders which are provided to an internal combustion engine where a part of the exhaust gas can be fed back from the exhaust system to the intake system, injection device (30) for injecting fuel into the cylinders, measuring device (40) for measuring the ignition timings in the cylinders, and estimating device (20) for estimating the cetane number of the fuel according to the measured ignition timing as well as any one of a first correlation between the ignition timing corresponding to the stage at which when one cylinder is in the intake stroke, another cylinder in the exhaust stroke exhausts non-burned gas and the cetane number and a second correlation between the ignition timing corresponding to the stage at which when one cylinder is in the intake stroke, another cylinder exhausts burned gas and the cetane number.

9 Claims, 8 Drawing Sheets

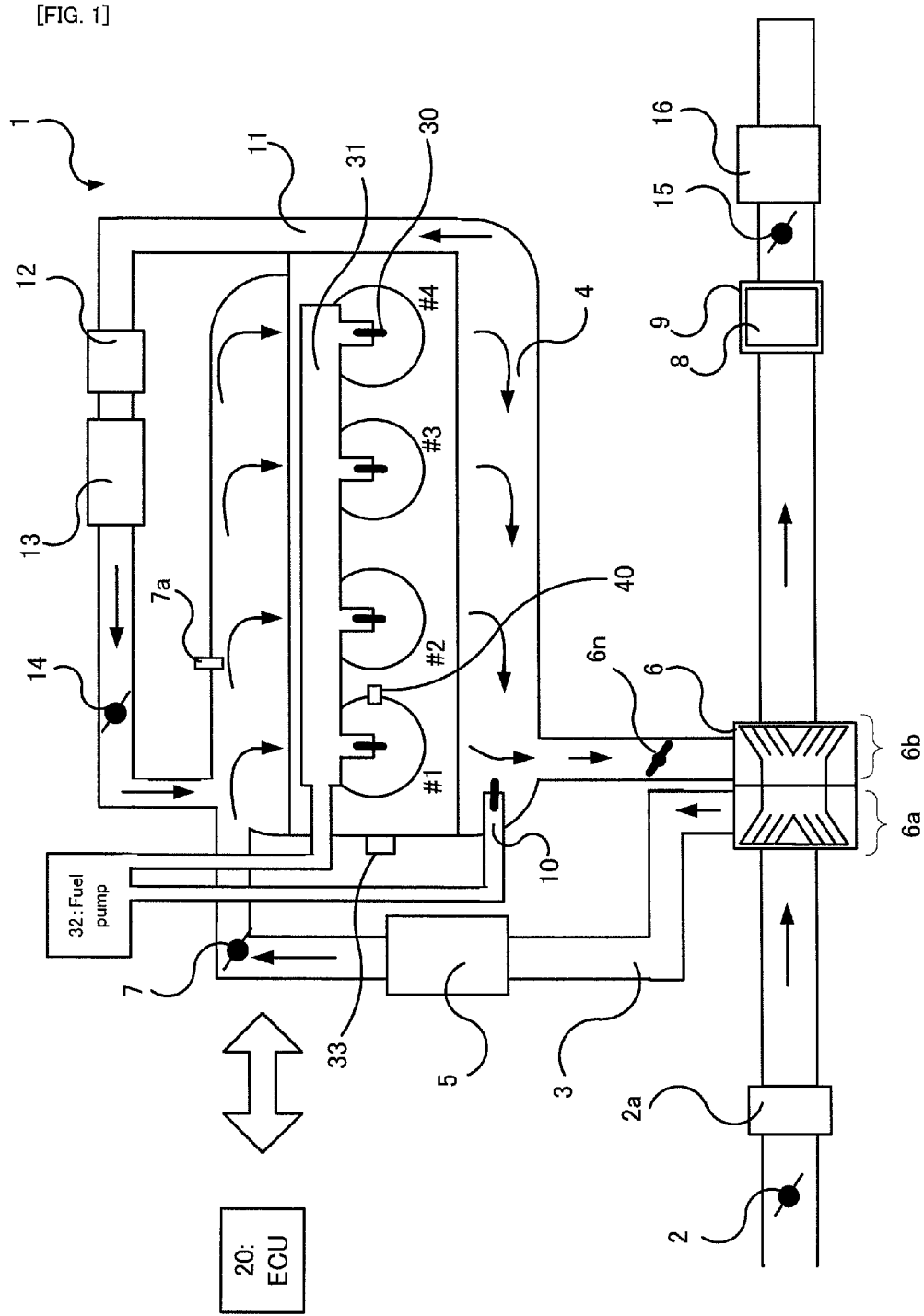
[FIG. 1]

[FIG. 2]
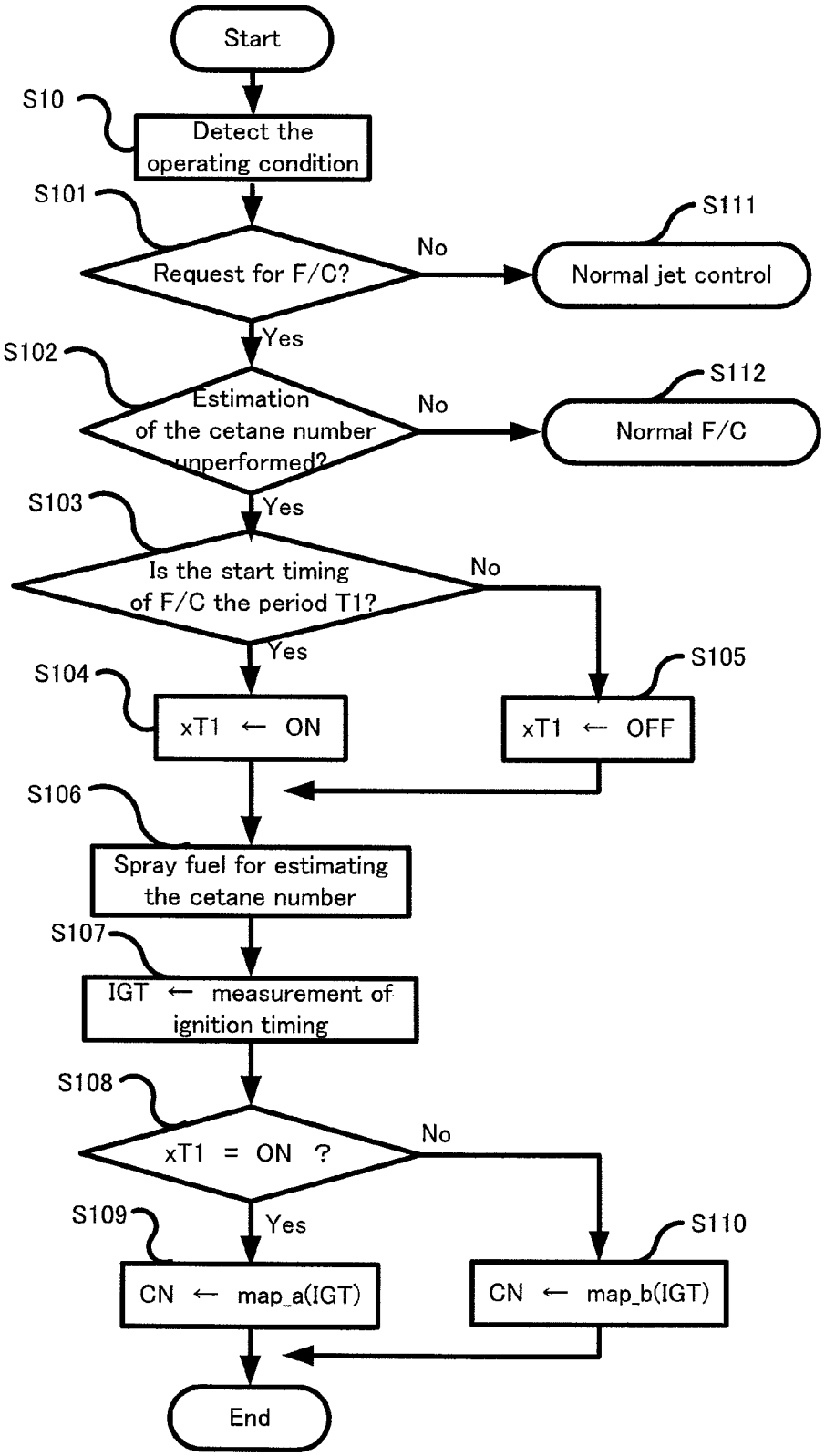

[FIG. 3]
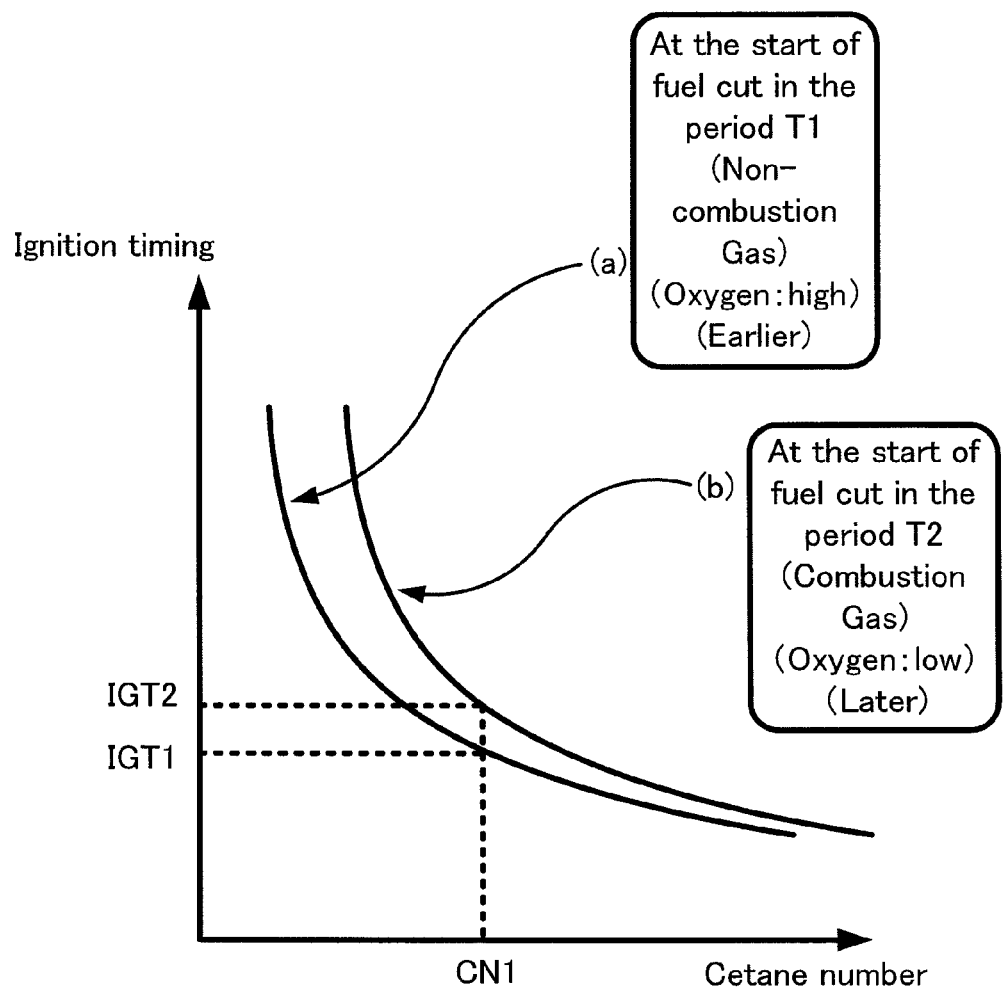

[FIG. 4]
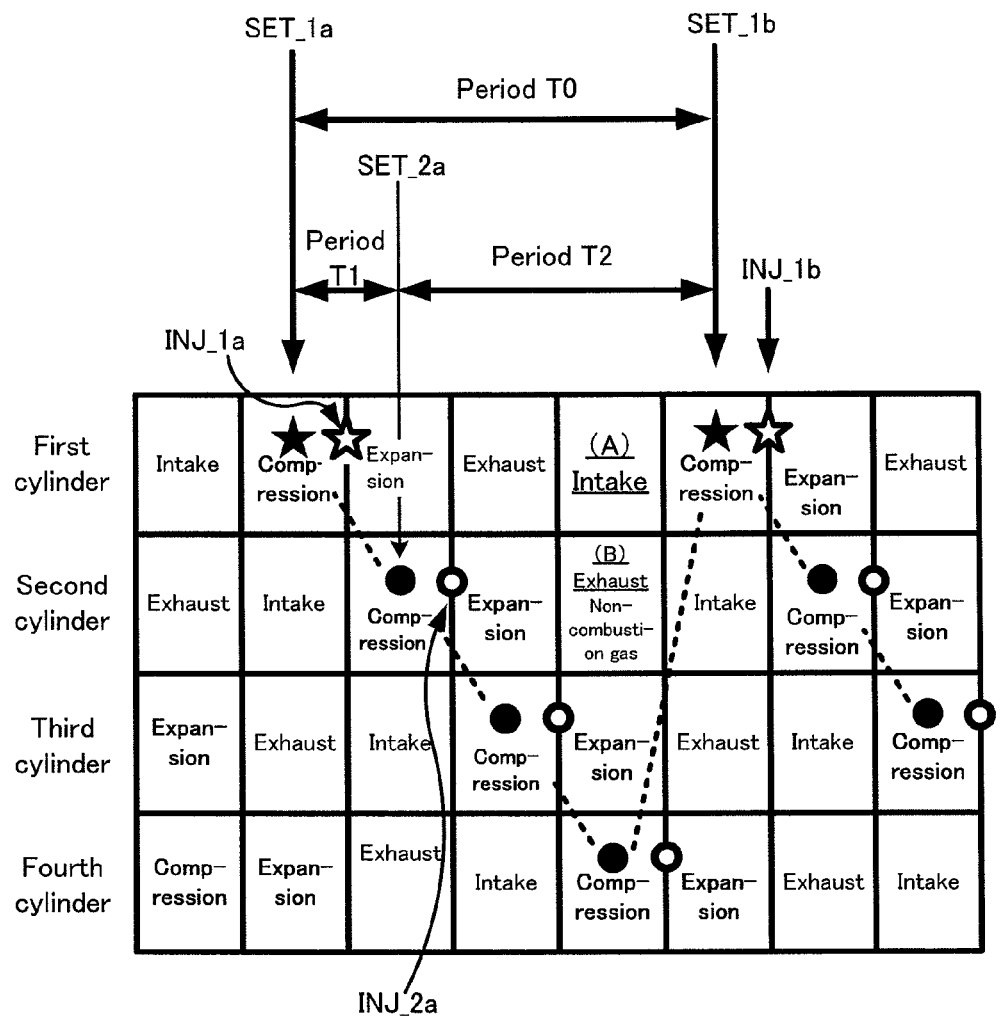

[FIG. 5]
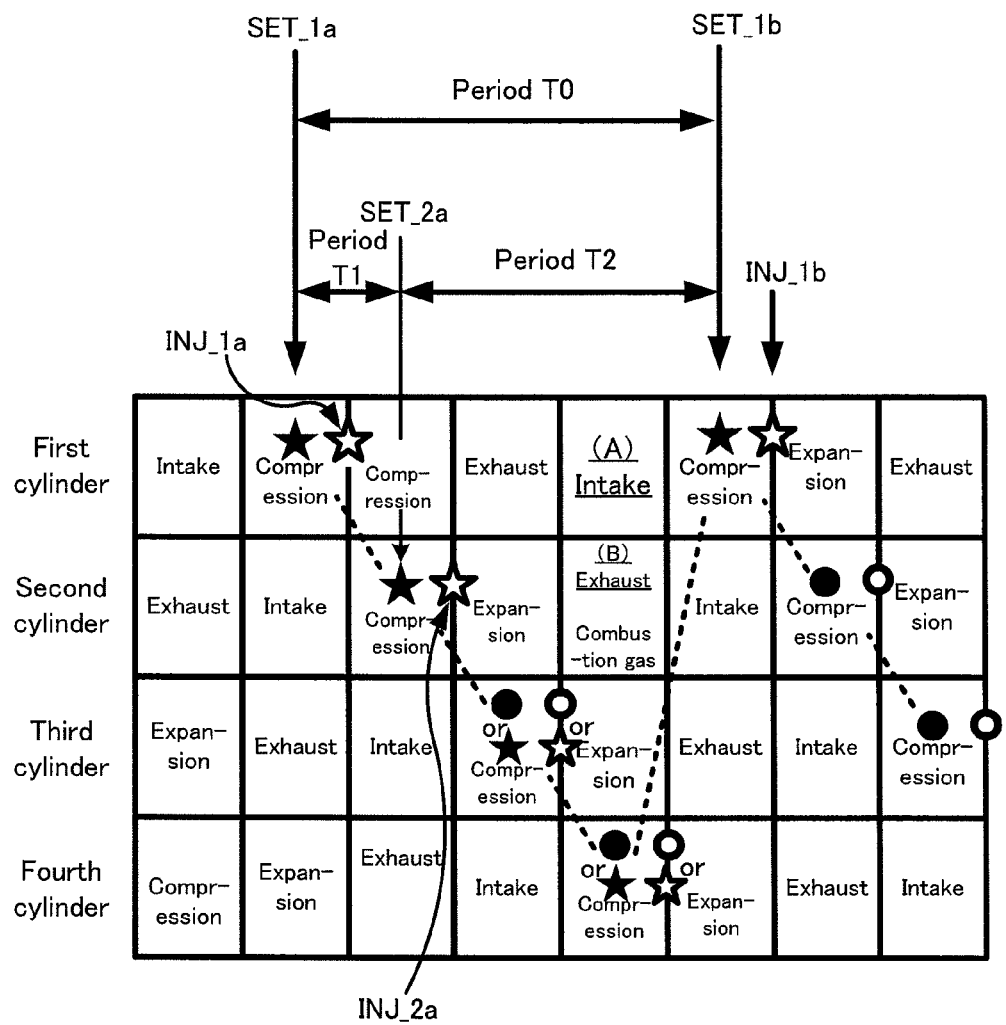

[FIG. 6]
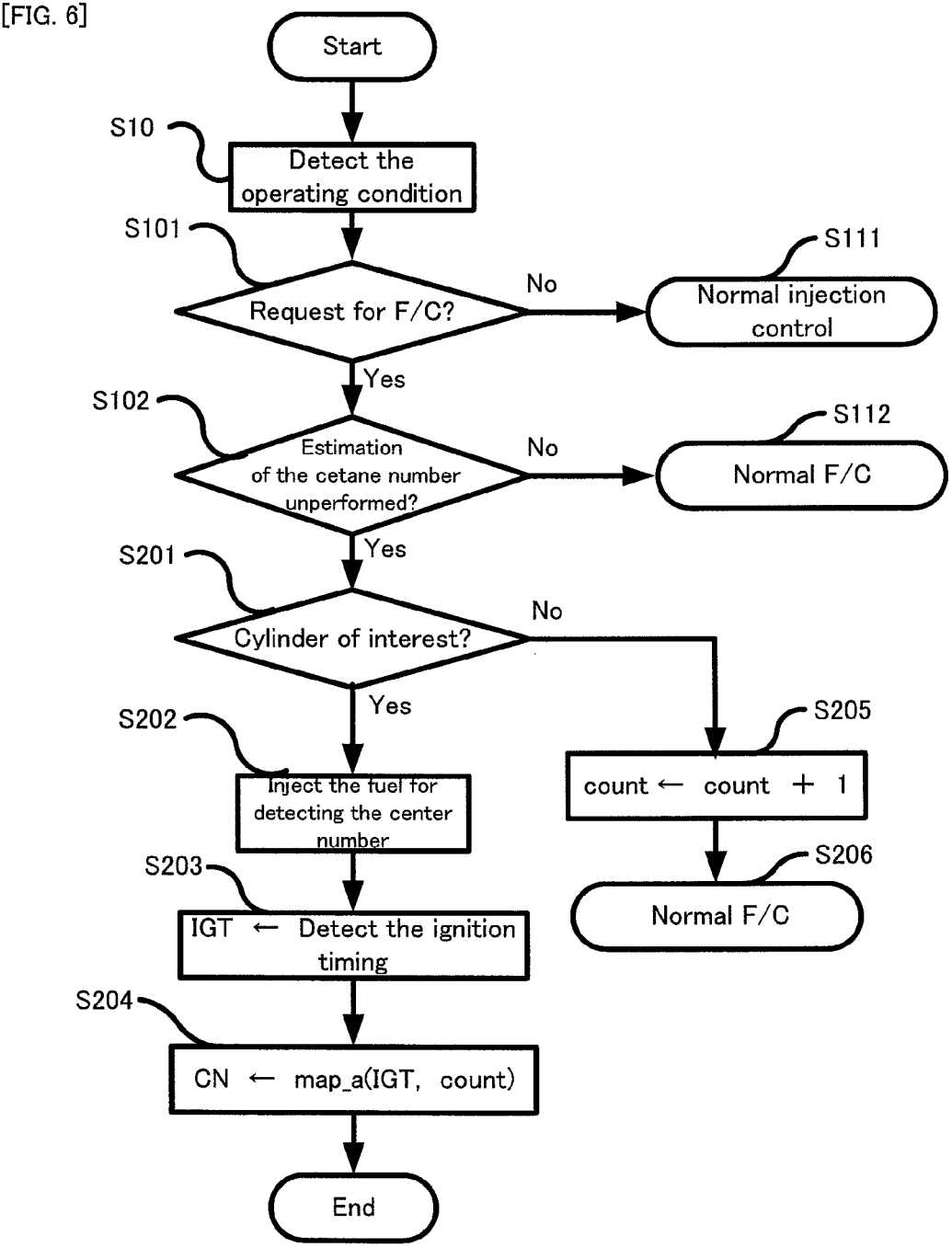

[FIG. 7]
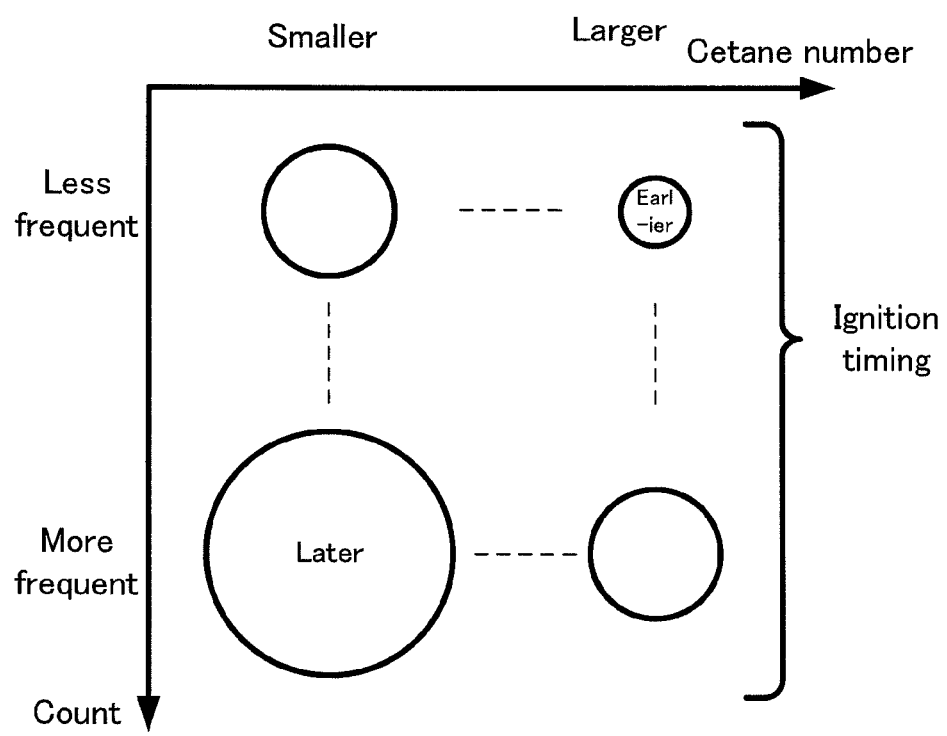

[FIG. 8]
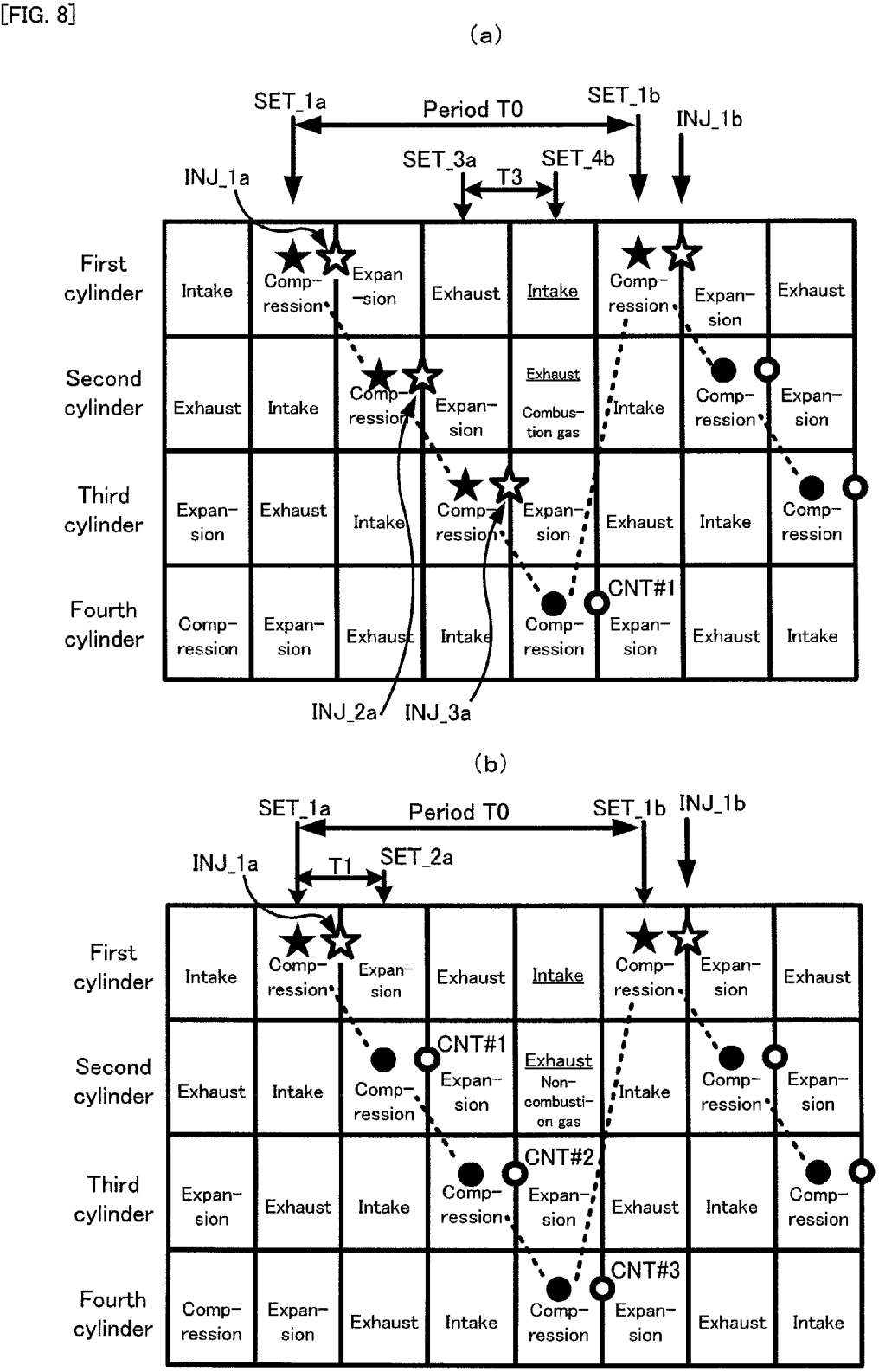

CETANE NUMBER ESTIMATING APPARATUS AND METHOD

CROSS REFERENCE TO RELATED APPLICATION

This application is a National Stage of International Application No. PCT/JP2008/059831 filed May 28, 2008, claiming priority based on Japanese Patent Application No. 2007-140545, filed May 28, 2007, the contents of all of which are incorporated herein by reference in their entirety.

TECHNICAL FIELD

The present invention relates to a cetane number estimating apparatus and method for estimating the cetane number of fuel in an internal combustion engine, such as a diesel engine.

BACKGROUND ART

As a method of detecting the cetane number associated with this type of apparatus, a method which uses the ignition timing of fuel has been suggested in a patent document 1 or the like. Specifically, in the patent document 1 or the like, after a lapse of predetermined time after the internal combustion engine is in a fuel cut state (hereinafter referred to as F/C, as occasion demands), fuel for detecting the cetane number is injected in a particular injection pattern. Then, the cetane number is detected by the measured ignition timing after the lapse of predetermined time.

Patent Document 1: Japanese Patent Application Laid Open No. 2005-344557
Patent Document 2: Japanese Patent Application Laid Open No. 2006-226188
Patent Document 3: Japanese Patent Application Laid Open No. 2006-16994
Patent Document 4: Japanese Patent Application Laid Open No. 2005-320872
Patent Document 5: Japanese Patent Application Laid Open No. 2006-183581
Patent Document 6: Japanese Patent Application Laid Open No. Hei 11-107771

DISCLOSURE OF INVENTION

Subject to be Solved by the Invention

However, in the method suggested in the patent document 1 or the like, as in an AT (Automatic Transmission) vehicle, in a case where a time of F/C during deceleration is set to be extremely shorter than the case of a normal vehicle, if the cetane number is not detected until the predetermined time elapses from immediately after the start of F/C, injection control goes back to the normal injection control of fuel. Thus, in the method suggested in the patent document 1 or the like, an opportunity to detect the cetane number is frequently missed, and the frequency of detection of the cetane number is reduced, which is technically problematic.

In view of the aforementioned problem, it is therefore an object of the present invention to provide a cetane number estimating apparatus which can properly estimate the cetane number of fuel.

Means for Solving the Subject

The above object of the present invention can be achieved by a cetane number estimating apparatus provided with: a plurality of cylinders provided for an internal combustion engine which can re-circulate one portion of exhaust gas from an exhaust system to an intake system; an injecting device for injecting fuel into the cylinders; a measuring device for measuring ignition timing in the cylinders on the basis of a change in pressure in the cylinders; and an estimating device for estimating the cetane number of the injected fuel on the basis of the measured ignition timing; in addition to any one of a first correlation between the cetane number and the ignition timing corresponding to a case where non-combustion gas in which the fuel is not burnt is emitted by another cylinder which is in an exhaust process, when one cylinder is in an intake process; and a second correlation between the cetane number and the ignition timing corresponding to a case where combustion gas in which the fuel is burnt is emitted by said another cylinder, when the one cylinder is in the intake process.

The "internal combustion engine" of the present invention conceptually includes an engine or mechanism which has one or a plurality of cylinders and which can be constructed to produce an explosive force generated when an air fuel mixture including various fuels in which at least the cetane number can be defined, such as light oil, as power, through a piston, a connecting rod, a crank shaft, and the like, as occasion demands. The "internal combustion engine" of the present invention indicates, for example, a two-cycle or four-cycle diesel engine or the like. The internal combustion engine of the present invention is provided with a storing device for storing such fuel, such as a fuel tank. In addition, the internal combustion engine may be provided with an EGR (Exhaust Gas Re-circulation) passage which passes from the exhaust system to the intake system of the internal combustion engine and which is to re-circulate one portion of the exhaust gas emitted from the plurality of cylinders, from the exhaust system to the intake system. In addition, the injecting device has a plurality of injectors, and each of the plurality of injectors may inject the fuel into the plurality of cylinders if each of the plurality of cylinders is in a compression process. Here, in the judgment about "the fuel is burnt" or "the fuel is not burnt" in the present invention, two situations may be judged at least; namely, whether or not the fuel is completely burnt. Alternatively, the extent and degree of fuel combustion may be judged; namely, whether or not the fuel is burned in a predetermined state.

In the cetane number estimating apparatus of the present invention, oxygen in the cylinders as an driving condition or operating condition, which is a significant factor in variation in the measured ignition timing, is quantitatively or qualitatively recognized. And along with this recognition, a map indicating a correlation between the ignition timing and the cetane number to estimate the cetane number, is changed. The "driving condition or operating condition" of the present invention conceptually includes a traveling state, running state or a driving state of the internal combustion engine. As the specific example of the driving condition or operating condition, there can be listed the number of revolutions of the internal combustion engine, an internal combustion engine temperature (i.e. an engine water temperature), pressure in the cylinders (i.e. supercharging pressure), a fuel temperature, fuel injection pressure when fuel is injected, an air fuel ratio (or the amount of oxygen), and the like. In particular, the pressure in the cylinders, a temperature of the internal combustion engine, and the air fuel ratio (or the amount of oxygen) are preferably included in the driving condition or operating condition due to their significant influence on the fuel ignition timing. Moreover, the "estimation" in the present invention typically means direct "estimation", "specification", or the like of a predetermined range of some physical quantity or parameter, which indicates the cetane number. Moreover, the "estimation" in the present invention may include indirect "detection", "measurement", or the like of some physical quantity and parameter which indicates the cetane number.

As a result, it is possible to estimate the cetane number, highly accurately and quickly, in consideration of a change in the driving condition or operating condition of the internal combustion engine in the various processes (or various cycles) immediately after F/C is performed. In particular, as in the AT (Automatic Transmission) vehicle, in the case where the time period of F/C during deceleration is set to be extremely shorter than the case of the normal vehicle, it is possible to estimate the cetane number, highly accurately and quickly, in consideration of the change in the driving condition or operating condition of the internal combustion engine. In particular, the one cylinder is preferably the cylinder in which the fuel is burnt before the estimation of the cetane number is started, in the viewpoint that the first correlation and the second correlation are defined highly accurately and simply.

Moreover, in particular, the estimating device may estimate the cetane number in a predetermined fuel cut state. In detail, fuel to estimate the cetane number is injected by the injecting device. Specifically, the fuel to estimate the cetane number with a smaller amount than a normal injection amount, may be injected in predetermined timing; in the predetermined fuel cut state in which degree or extent of accelerator opening is reduced from degree or extent of the normal driving condition or operating condition. Here, the "predetermined fuel cut state" of the present invention conceptually indicates a state; in which a vehicle is travelling and in which the injection of fuel to generate the power of the internal combustion engine is stopped. As one typical example, it indicates a state in which a vehicle is during deceleration. Therefore, it is possible to make the change in pressure in the cylinders smaller than in the normal operation. At the same time, it is possible to make the change in the driving condition such as an engine water temperature indicating the temperature of the internal combustion engine, smaller than a change in the normal operation. As a result, it is possible to define the first correlation and the second correlation, highly accurately and simply.

The cetane number estimating process performed in such a fuel cut state conceptually includes physical, mechanical, electrical, or chemical control, or logic operation or numeric operation, according to a process, algorithm, or arithmetic expression determined to be what can estimate the cetane number with accuracy to the extent that at least there is no trouble in practice, on an experimental, experiential, theoretical, or simulation basis in advance. In particular, it conceptually includes a process provided with the injection of fuel which can be used to estimate the cetane number, preferably provided with the injection of a small amount of fuel. For example, as a preferable aspect, the cetane number estimating device performs the cetane number estimating process including various processes; such as (i) the measurement of an ignition delay period in which a difference in the cetane number can significantly appear in the injected fuel, based on a change in combustion pressure or (ii) a change in the number of revolutions of the engine, and (iii) the injection of a slight amount of fuel in the fuel cut state. For example, the cetane number estimating device estimates the cetane number on the basis of the ignition delay period or the ignition timing.

Therefore, the cetane number estimating device may be defined as a whole system which can appropriately include; for example, (i) an fuel injecting apparatus, (ii) a combustion pressure sensor which can be used to measure the ignition dely or the ignition timing, (iii) an engine-revolution-number sensor or a crank position sensor, which can be used to specify the number of revolutions of the engine, and (iv) various processing units, such as an ECU (Electronic Control Unit), various controllers, or various computer systems, which can physically, mechanically, or electrically control the aforementioned apparatus or sensors in accordance with proper algorithms and operation processes. Alternatively, the cetane number estimating device may be defined only as the ECU or various controllers, which electrically control the existing units, such as the injecting apparatus which are not provided only for the estimation of the cetane number, in accordance with a proper control program.

In one aspect of the cetane number estimating apparatus of the prestn invention, the first correlation defines the ignition timing which is relatively earlier or faster with respect to one cetane number, and the second correlation defines the ignition timing which is relatively later or slower with respect to the one cetane number.

According to this aspect, if said another cylinder emits the non-combustion gas, the map to define the first correlation in which the ignition timing is relatively earlier or faster with respect to the fuel with the one cetane number, is used to estimate the cetane number. This is because; in said another cylinder which is in the exhaust process when the one cylinder is in the intake process, the amount of oxygen in the cylinders as the driving condition immediately before the start of the cetane number estimating process, is relatively larger due to the non-combustion gas, and the ignition timing is relatively earlier or faster.

On the other hand, if said another cylinder emits the combustion gas, the map to define the second correlation in which the ignition timing is relatively later or slower with respect to the fuel with the one cetane number described above, is used to estimate the cetane number. This is because; in said another cylinder which is in the exhaust process when the one cylinder is in the intake process, the amount of oxygen in the cylinders as the driving condition immediately before the start of the cetane number estimating process, is relatively smaller due to the combustion gas, and the ignition timing is relatively later or slower.

In another aspect of the cetane number estimating apparatus of the prestn invention, the estimating device estimates the cetane number on the basis of the first correlation, if fuel cut is performed in a first period which is a time interval; from timing of a first compression process in the one cylinder; to timing of a second compression process in said another cylinder which performs the second compression process next to the one cylinder.

According to this aspect, of the first correlation and the second correlation, the first correlation can be easily selected by whether or not fuel cut is performed in the first period; and the cetane number can be estimated on the basis of the selected first correlation.

In another aspect of the cetane number estimating apparatus of the present invention, the estimating device estimates the cetane number on the basis of the second correlation, if fuel cut is performed in a second period which is a time interval; from timing of a second compression process in said another cylinder which performs the second compression process next to a first compression process in the one cylinder; to timing of a third compression process performed next to the first compression process in the one cylinder.

According to this aspect, of the first correlation and the second correlation, the second correlation can be easily selected by whether or not fuel cut is performed in the second period; and the cetane number can be estimated on the basis of the selected second correlation.

In another aspect of the cetane number estimating apparatus of the prestn invention, the estimating device further estimates the cetane number on the basis of a third correlation among the cetane number, the ignition timing, and frequency of emission of non-combustion gas in which the fuel is not burnt, in the plurality of cylinders.

According to this aspect, it is possible to estimate the cetane number, highly accurately, on the basis of the map to define the third correlation among the frequency of emission of the non-combustion gas (i.e. frequency of a non-combustion cycle), the cetane number, and the ignition timing. This is because it is possible to focus on the amount of heat received by the internal combustion engine, such as a cylinder head, in the estimation of the cetane number, so that it is possible to quantitatively or qualitatively recognize thermal energy received by the internal combustion engine as the driving condition, which is a significant factor in variation in the measured ignition timing.

In an aspect associated with the aforementioned third correlation, the third correlation may be defined such that the ignition timing becomes later or slower as the emission of the non-combustion gas is more frequent.

By virtue of such construction, it is possible to estimate the cetane number, more highly accurately, on the basis of the third correlation which is highly accurately defined such that; as the emission of the non-combustion gas is more frequent, i.e. as the emission of the combustion gas is less frequent, the ignition timing is later or slower. The reason that the third correlation is defined in this manner is that; as the emission of the non-combustion gas is more frequent, i.e. as the emission of the combustion gas is less frequent, the amount of heat received by the cylinder head or the like as the driving condition immediately before the start of the cetane number estimating process, is smaller due to the emission of the combustion gas, which is relatively less frequent; so that the ignition timing is later or slower.

The above object of the present invention can be also achieved by another cetane number estimating apparatus provided with: a plurality of cylinders provided for an internal combustion engine; an injecting device for injecting fuel into the cylinders; a measuring device for measuring ignition timing in the cylinders on the basis of a change in pressure in the cylinders; and an estimating device for estimating the cetane number of the injected fuel on the basis of the measured ignition timing in addition to a third correlation among the cetane number, the ignition timing, and frequency of emission of non-combustion gas in which the fuel is not burnt, in the plurality of cylinders.

According to the other cetane number estimating apparatus of the present invention, it is possible to estimate the cetane number, highly accurately, on the basis of the map to define the third correlation among the frequency of emission of the non-combustion gas (i.e. the frequency of the non-combustion cycle), the cetane number, and the ignition timing. This is because; it is possible to focus on the amount of heat received by the internal combustion engine, such as a cylinder head, in the estimation of the cetane number, so that it is possible to quantitatively or qualitatively recognize thermal energy received by the internal combustion engine as the driving condition, which is a significant factor in variation in the measured ignition timing.

As a result, it is possible to estimate the cetane number, highly accurately and quickly, in consideration of the change in the driving condition of the internal combustion engine, in the various processes (or various cycles) immediately after F/C is performed. In particular, as in the AT vehicle, in the case where a time period of F/C during deceleration is set to be extremely shorter than the case of the normal vehicle, it is possible to estimate the cetane number, highly accurately and quickly, in consideration of the change in the driving condition of the internal combustion engine.

The above object of the present invention can be also achieved by a first cetane number estimating method provided with: an injecting process of injecting fuel into a plurality of cylinders provided for an internal combustion engine which can re-circulate one portion of exhaust gas from an exhaust system to an intake system; a measuring process of measuring ignition timing in the cylinders on the basis of a change in pressure in the cylinders; and an estimating process of estimating the cetane number of the injected fuel on the basis of the measured ignition timing; in addition to any one of a first correlation between the cetane number and the ignition timing corresponding to a case where non-combustion gas in which the fuel is not burnt is emitted by another cylinder which is in an exhaust process, when one cylinder is in an intake process; and a second correlation between the cetane number and the ignition timing corresponding to a case where combustion gas in which the fuel is burnt is emitted by said another cylinder, when the one cylinder is in the intake process.

According to the first cetane number estimating method of the present invention, it is possible to receive various benefits of the aforementioned cetane number estimating apparatus.

Incidentally, in response to the various aspects of the aforementioned cetane number estimating apparatus of the present invention, the first cetane number estimating method of the present invention can also adopt various aspects.

The above object of the present invention can be also achieved by a second cetane number estimating method provided with: an injecting process of injecting fuel into a plurality of cylinders provided for an internal combustion engine; a measuring process of measuring ignition timing in the cylinders on the basis of a change in pressure in the cylinders; and an estimating process of estimating the cetane number of the injected fuel on the basis of the measured ignition timing in addition to a third correlation among the cetane number, the ignition timing, and frequency of emission of non-combustion gas in which the fuel is not burnt, in the plurality of cylinders.

According to the second cetane number estimating method of the present invention, it is possible to receive various benefits of the aforementioned other cetane number estimating apparatus.

Incidentally, in response to the various aspects of the aforementioned other cetane number estimating apparatus of the present invention, the second cetane number estimating method of the present invention can also adopt various aspects.

BRIEF DESCRIPTION OF DRAWINGS

FIG. 1 is a schematic diagram schematically showing the basic structure of a vehicle equipped with an exhaust gas purifying apparatus of an internal combustion engine in an embodiment.

FIG. 2 is a flowchart showing a flow of a cetane number estimating process in the embodiment.

FIG. 3 is a graph showing a first correlation between the cetane number and ignition timing corresponding to a case where F/C is started in a period T1 and a second correlation between the cetane number and ignition timing corresponding to a case where F/C is started in a period T2, in the embodiment.

FIG. 4 is a schematic diagram schematically showing the process timing of four cylinders in the case where F/C is started in the period T1, in the embodiment.

FIG. 5 is a schematic diagram schematically showing the process timing of four cylinders in the case where F/C is started in the period T2, in the embodiment.

FIG. 6 is a flowchart showing a flow of a cetane number estimating process in another embodiment.

FIG. 7 is a map for defying a third correlation among the frequency of a non-combustion cycle, the cetane number, and the ignition timing, in the other embodiment.

FIG. 8 are a schematic diagram schematically showing the process timing of four cylinders if the frequency of emission of non-combustion gas is relatively low (FIG. 8(a)) and a schematic diagram schematically showing the process timing of four cylinders if the frequency of emission of non-combustion gas is relatively high (FIG. 8(b)), in the other embodiment.

DESCRIPTION OF REFERENCE CODES 1 engine
2 electronic throttle valve
2a AFM (Air Flow Meter)
1 to #4 cylinder
3 intake passage
4 exhaust passage
5 intake filtration air filter
6 turbocharger
6a compressor
6b turbine
7 intake volume adjustment throttle valve
7a supercharging pressure sensor
8 DPNR catalyst
9 exhaust gas purifying unit
10 fuel addition valve
11 EGR passage
12 EGR catalyst
13 EGR cooler
14 EGR valve
15 exhaust throttle valve
16 muffler
20 ECU
30 injector
31 common-rail
32 fuel pump
33 crank angle sensor
40 pressure sensor

BEST MODE FOR CARRYING OUT THE INVENTION

Hereinafter, the preferred embodiments of the present invention will be explained with reference to the drawings.

(1) Basic Structure of Vehicle

Firstly, with reference to FIG. 1, an explanation will be given on the basic structure of a vehicle equipped with an exhaust gas purifying apparatus of an internal combustion engine in an embodiment. FIG. 1 is a schematic diagram schematically showing the basic structure of the vehicle equipped with the exhaust gas purifying apparatus of the internal combustion engine in the embodiment. Incidentally, the vehicle equipped with the exhaust gas purifying apparatus of the internal combustion engine in the embodiment shows one aspect applied to a so-called inline four-cylinder reciprocating internal combustion engine (that is, a "diesel engine": hereinafter referred to as an "engine 1", as occasion demands) in which four cylinders, a first cylinder #1 to a fourth cylinder #4, are aligned. The engine 1 is used as, for example, a driving source for a vehicle run, and a drive force generated on the engine 1 is transmitted to wheels through a clutch, a transmission, a differential gear, and a drive shaft not illustrated.

As shown in FIG. 1, the engine 1 is provided with an electronic throttle valve 2, an AFM (Air Flow Meter) 2a, cylinders #1 to #4, an intake passage 3, an exhaust passage 4, an intake filtration air filter 5, a turbocharger 6, a compressor 6a, a turbine 6b, an intake volume adjustment throttle valve 7, a supercharging pressure sensor 7a, a DPNR (Diesel Particulate-NOx active Reduction system) catalyst 8, an exhaust gas purifying unit 9, a fuel addition valve 10, an EGR passage 11, an EGR catalyst 12, an EGR cooler 13, an EGR valve 14, an exhaust throttle valve 15, a muffler 16, an ECU 20, an injector 30, a common-rail 31, a fuel pump 32, a crank angle sensor 33 for measuring the number of revolutions of the internal combustion engine, and a pressure sensor 40. Incidentally, the ECU 20 constitutes one specific example of the "estimating device" of the present invention. In particular, in a memory device provided for the ECU 20, various data to be inputted such as the detected cetane number can be stored, and a predetermined program and a predetermined map are stored which are used when the ECU 20 functions as the estimating device.

Moreover, the pressure sensor 40 for measuring a pressure in the cylinder constitutes one specific example of the "measuring device" of the present invention. Moreover, the injector 30 constitutes one specific example of the "injecting device" of the present invention.

As shown in FIG. 1, the engine 1 is installed on a vehicle as a driving power source. In a recirculation system of the engine 1, i.e. an EGR (Exhaust Gas Recirculation) system, the intake passage 3 and the exhaust passage 4 are connected to the cylinders #1 to #4. The intake passage 3 is provided with the intake filtration air filter 5, the compressor 6a of the turbocharger 6, and the throttle valve 7 for adjusting an intake volume. The exhaust passage 4 is provided with the turbine 6b of the turbocharger 6. On the downstream side of the turbine 6b of the exhaust passage 4, there are provided the exhaust gas purifying unit 9 including the DPNR catalyst 8 as one example of storage-reduction NOx catalyst and the fuel addition valve 10 as a fuel adding device for adding fuel as a reducing agent in the upstream of the DPNR catalyst 8. The exhaust passage 4 and the intake passage 3 are connected in the EGR passage 11, and the EGR passage 11 is provided with the EGR catalyst 12, the EGR cooler 13, and the EGR valve 14 from the upstream side to the downstream side on the basis of a direction of a recirculation gas flown.

The turbocharger 6 is a variable nozzle turbocharger provided with a variable nozzle 6n. By changing the opening amount of the variable nozzle 6n, it is possible to change the passage cross section of an enter portion of the turbine 6b.

Moreover, the intake system of the engine 1 is constructed to intake into a combustion chamber in the cylinders #1 to #4, through a not-illustrated air duct for taking external air, the AFM (Air Flow Meter) 2a, the electronic throttle valve 2, the intake passage 3, and a plurality of an intake port. The intake port is provided with an intake valve for opening and closing the intake port. On the other hand, the exhaust system of the engine 1 is constructed to emit exhaust gas from the combustion chamber in the cylinders #1 to #4 into the air, through an exhaust port, the not-illustrated exhaust passage 4, the DPNR catalyst 8, and the muffler 16.

The fuel addition valve 10 is provided to add the fuel to the upstream of the DPNR 8 and to generate a reducing atmosphere necessary for the release of NOx absorbed in the DPNR 8 and the S-reproduction of the DPNR 8. The fuel adding operation of the fuel addition valve 10 is controlled by the engine control unit (ECU) 20. The ECU 20 is a known computer unit for controlling the driving condition or operating condition of the engine 1 by operating various apparatuses, such as the injector 30 for injecting the fuel to the cylinders #1 to #4 and the common-rail 31 for storing a fuel pressure supplied to the injector 30 from the fuel pump 32. The ECU 20 controls the fuel injecting operation of the injector 30 such that an air fuel ratio given as a mass ratio between the air breathed into the engine 1 and the fuel added from the injector 30, is controlled to be the leaner side than a theoretical air fuel ratio.

The DPNR catalyst 8 has such a characteristic that it stores nitride oxide (NOx) when an exhaust air fuel ratio is leaner than the theoretical air fuel ratio and that it releases the stored NOx to be reduced or deoxidized to nitrogen (N2) when the exhaust air fuel ratio is the theoretical air fuel ratio or is richer than the theoretical air fuel ratio. Since the amount of NOx which can be stored in the DPNR catalyst 8 has an upper limit, NOx reduction in which NOx is released from a catalyst 14 to be reduced or deoxidized to N2 such that the amount of stored NOx does not reach the upper limit is performed at predetermined intervals, so that the exhaust gas purifying performance of the DPNR catalyst 8 is maintained to be high. Moreover, the DPNR catalyst 8 is poisoned by sulfur oxide (SOx) included in the exhaust gas. Thus, the S reproduction is performed at predetermined intervals, in which the DPNR catalyst 8 is heated to a temperature range where sulfur (S) is released from the NOx catalyst and the sulfur poisoning is recovered by setting the exhaust air fuel ratio to the theoretical air fuel ratio or to be richer than the theoretical air fuel ratio, thereby restoring the function of the DPNR catalyst 8. Hereinafter, the NOx reduction and the S reproduction are collectively referred to as a function restoring process in some cases. The function restoring process is performed by adding the fuel from the fuel addition valve 10 into the exhaust passage 4 in the upstream of the DPNR catalyst 8.

Incidentally, in the present invention, the storage-reduction NOx catalyst only needs to be able to maintain NOx in the catalyst, and the aspect of maintenance of Nox, which is absorption or adsorption, is not limited by a term of storage. Moreover, the aspect of the poisoning of SOx is also not considered. Moreover, the aspect of the release of NOx and SOx is also not considered.

The operations of various actuators are controlled by the engine control unit (ECU) 20. The ECU 20 is constructed as a computer including a microprocessor and peripheral equipment such as a RAM and a ROM necessary for the operation. The ECU 20 is a known computer unit for controlling the driving condition or operating condition of the engine 1 by operating various apparatuses such as the variable nozzle 6n, on the basis of signals inputted from various sensors. What are connected to the ECU 20 are, for example, the crank angle sensor 33 for outputting a signal corresponding to the angle of a crank shaft of the engine 1, an exhaust gas temperature sensor for outputting a signal corresponding to the temperature of the exhaust gas which passes the exhaust gas purifying unit 9, an AFM 2a, and the like. The ECU 20 controls the driving condition or operating condition of the engine 1 with referred to the output signals. Moreover, the ECU functions as the controlling device of the present invention by executing routines shown in FIG. 2 and FIG. 6. Incidentally, the details of the routines will be described later. There are other various control targets by the ECU 20; however, the illustration will be omitted.

(2) Estimating Process of Fuel Cetane Number

Next, with reference to FIG. 2 and FIG. 3, a cetane number estimating process in the embodiment, will be explained. FIG. 2 is a flowchart showing a flow of the cetane number estimating process in the embodiment. Incidentally, the cetane number estimating process is repeatedly performed by the ECU 20 with a predetermined period such as several tens milliseconds and several milliseconds. FIG. 3 is a graph showing a first correlation between the cetane number and ignition timing corresponding to a case where F/C, i.e. fuel cut is started in a period T1; and a second correlation between the cetane number and ignition timing corresponding to a case where F/C is started in a period T2; in the embodiment.

As shown in FIG. 2, firstly, under the control of the ECU 20, various variables and parameters indicating the driving condition or operating condition of the internal combustion engine, are detected; for example, by detecting the number of revolutions of the internal combustion engine by the crank angle sensor 33 (step S10).

Then, under the control of the ECU 20, it is judged whether or not a request for fuel cut (F/C) is made (step S101). Here, if it is judged that the request for fuel cut is made (the step S101: Yes), further, it is judged whether or not the estimation of the cetane number is unperformed; in other words, it is judged whether or not the estimation of the cetane number has not been performed and needs to be performed, under the control of the ECU 20 (step S102). Here, if the estimation of the cetane number is unperformed, i.e. if the estimation of the cetane number has not been performed and needs to be performed (the step S102: Yes), then, it is further judged whether or not the start timing of F/C is included in the period T1 (step S103). Here the period T1 in the embodiment, means a period; from immediately after timing SET_1a in which a fuel injection pattern is set in the compression process in the first cylinder corresponding to a cylinder of interest; to immediately before timing SET_2a in which the fuel injection pattern is set in the compression process in the second cylinder in which the compression process is performed next to the first cylinder. Moreover, the cylinder of interest in the embodiment, means a cylinder; which has the pressure sensor 40 and in which the cetane number estimating process is performed.

As a result of the judgment in the step S103, if the start timing of F/C is included in the period T1 (the step S103: Yes), "ON" is inputted to a flag variable xT1, under the control of the ECU 20 (step S104). On the other hand, as a result of the judgment in the step S103, if the start timing of F/C is not included in the period T1 (the step S103: No), "OFF" is inputted to the flag variable xT1, under the control of the ECU 20 (step S105).

Then, under the control of the ECU 20, the fuel for estimating the cetane number, is injected by the injector 30 (step S106).

Then, under the control of the ECU 20, the ignition timing of fuel is actually measured by the pressure sensor 40, and the measured value is substituted for a variable IGT (step S107).

Then, under the control of the ECU 20, it is judged whether or not the flag variable xT1 is "ON" (step S108). Here, if it is judged that the flag variable xT1 is "ON" (the step S108: Yes), the cetane number is estimated on the basis of a map map_a (IGT) to define the first correlation between the cetane number and the ignition timing, corresponding the case where F/C is started in the period T1, under the control of the ECU 20 (step S109).

Specifically, if F/C is started in the period T1, as shown in a curve (a) in FIG. 3 described above, the map to define the first correlation in which ignition timing IGT1 is relatively earlier or faster than ignition timing IGT2, with respect to the fuel with the same cetane number CN1; is used to estimate the cetane number. This is because if F/C is started in the period T1, the amount of oxygen in the cylinder or cylinders as the driving condition or operating condition immediately before the start of the cetane number estimating process; is relatively larger due to non-combustion gas, and the ignition timing is relatively earlier or faster.

On the other hand, as a result of the judgment in the step S108, if it is judged that the flag variable xT1 is not "ON" (the step S108: No), the cetane number is estimated on the basis of a map map_b(IGT) to define the second correlation between the cetane number and the ignition timing, corresponding the case where F/C is started in the period T2, under the control of the ECU 20 (step S110).

Specifically, if F/C is started in the period T2, as shown in a curve (b) in FIG. 3 described above, the map to define the second correlation in which ignition timing IGT2 is relatively later or slower than the ignition timing IGT1, with respect to the fuel with the same cetane number CN1; is used to estimate the cetane number. This is because if F/C is started in the period T2, the amount of oxygen in the cylinder or cylinders as the driving condition or operating condition immediately before the start of the cetane number estimating process; is relatively littler or smaller due to combustion gas, and the ignition timing is relatively later or slower.

As described above, in the cetane number estimating method focusing on the amount of oxygen in the embodiment, the oxygen in the cylinder or cylinders as the driving condition or operating condition, which is a significant factor in variation in the measured ignition timing; is quantitatively or qualitatively recognized. Then along with this recognition, the map indicating the correlation between the ignition timing and the cetane number, to estimate the cetane number; is changed.

As a result, it is possible to estimate the cetane number, highly accurately and quickly, in consideration of the change in the driving condition or operating condition of the internal combustion engine, in the various processes (and various cycles), immediately after F/C is performed. In particular, as in the AT vehicle (Automatic Transmission vehicle), in the case where the time period of F/C during deceleration is set to be extremely shorter than the case of the normal vehicle; it is possible to estimate the cetane number, highly accurately and quickly, in consideration of the change in the driving condition or operating condition of the internal combustion engine.

On the other hand, as a result of the judgment in the step S101, if it is not judged that the request for fuel cut is made (the step S101: No), normal injection control for fuel is performed under the control of the ECU 20 (step S111). Alternatively, on the other hand, as a result of the judgment in the step S102, if the estimation of the cetane number is not unperformed, i.e. if the estimation of the cetane number has been completed and does not need to be performed (the step S102: No), normal F/C in which the cetane number does not have to be estimated; is performed in order to limit or reduce fuel consumption (step S112).

(3) Study of Operation and Effect in Embodiment

Next, with reference to FIG. 3 described above in addition to FIG. 4 and FIG. 5, an explanation will be given on the operation and effect of the cetane number estimating process, in the embodiment.

(3-1) General Problem

In the internal combustion engine, such as a general diesel engine, for example, the ignition timing of fuel, such as light oil, changes depending on the fuel injection pattern such as the timing or time period that fuel is injected, and the injection amount of fuel. Even if such a fuel injection pattern is fixed, the ignition timing of fuel changes due to an influence of the driving condition or operating condition of the internal combustion engine; such as the number of revolutions of the internal combustion engine, an internal combustion engine temperature (i.e. an engine water temperature), pressure in the cylinder or cylinders (i.e. supercharging pressure), a fuel temperature, and fuel injection pressure when the fuel is injected.

In particular, if the driving condition or operating condition of the internal combustion engine is changed from normal combustion to fuel cut (hereinafter referred to as "F/C" as occasion demands) by an accelerator operation by a driver, i.e. by the adjustment of an amount of accelerator opening; then, the quantity of state is rapidly changed which indicates a plurality of types of driving condition or operating conditions, such as the number of revolutions of the internal combustion engine, an air fuel ratio, or a temperature in the cylinder or cylinders. Thus, even if the fuel injection is performed in a predetermined injection pattern to estimate the cetane number, in other words, even if the injection amount of fuel is set to a predetermined injection amount or even if the injection timing of fuel is set to predetermined injection timing; there are variations in the measured ignition timing. Thus, it is technically hard to uniquely specify the cetane number on the basis of the measured ignition timing.

In a cetane number detecting method in a comparative example, the cetane number is not detected until a predetermined time elapses from immediately after the start of F/C. However, as in the AT (Automatic Transmission) vehicle, in the case where the time period of F/C during deceleration is set to be extremely shorter than the case of the normal vehicle, if the cetane number is not detected until the predetermined time elapses from immediately after the start of F/C; the driving condition or operating condition goes back to the normal injection control of fuel. Thus, an opportunity to detect the cetane number is frequently missed, and the frequency of detection of the cetane number is reduced, which is technically problematic.

(3-2) Cetane Number Estimating Method Focusing on Amount of Oxygen

Next, with reference to FIG. 3 described above in addition to FIG. 4 and FIG. 5, an explanation will be given on the cetane number estimating method focusing on the amount of oxygen in the embodiment. FIG. 4 is a schematic diagram schematically showing the process timing of four cylinders in the case where F/C is started in the period T1, in the embodiment. FIG. 5 is a schematic diagram schematically showing the process timing of four cylinders in the case where F/C is started in the period T2, in the embodiment.

The cetane number estimating method focusing on the amount of oxygen in the embodiment, is, in other words, a method of estimating the cetane number on the basis of the amount of oxygen qualitatively or quantitatively determined; by that another cylinder assigned to be in the exhaust process, emits the combustion gas in which the fuel is burnt, or emits the non-combustion gas in which the fuel is not burnt, when one cylinder of interest is in the intake process.

Hereinafter, this will be specifically explained. In general, for example, if a four-cycle internal combustion engine provided with four cylinders is considered, four types of processes, an intake process, a compression process, a combustion process, and an exhaust process, are performed in the four cylinders in order of a first cylinder #1, a second cylinder #2, a third cylinder #3, and a fourth cylinder #4, with a crank angle of 180 degrees shifted to each other, as shown in FIG. 4 and FIG. 5. In the normal fuel injection, a fuel injection pattern to be injected next time is set in timing shown by black stars in FIG. 4 and FIG. 5; and the fuel injection by the injection pattern is performed in timing shown by white stars in FIG. 4 and FIG. 5. On the other hand, in the general injection control of the fuel to estimate the cetane number, if F/C is started at a time interval shown by a period T0 in FIG. 4 and FIG. 5, a predetermined injection pattern to detect the cetane number, is set in timing SET_1b and the injection pattern to detect the cetane number, is performed in timing INJ_1b, in the fastest case. Here, the period T0 means a period; from immediately after the timing SET_1a in which the fuel injection pattern is set in the compression process in a cycle in the first cylinder corresponding to the cylinder of interest; to immediately before the timing SET_1b in which the fuel injection pattern is set in the compression process in a next cycle in the same cylinder.

In contrast, the cetane number estimating method focusing on the amount of oxygen in the embodiment, changes a cetane number estimating method based on the fact in which period i.e. the period T1 or the period T2, F/C is started, in dividing the period T0 into two periods, the period T1 and the period T2. Here, the period T1 in the embodiment, means a period; from immediately after the timing SET_1a in which the fuel injection pattern is set in the compression process in a cycle in the first cylinder corresponding to the cylinder of interest; to immediately before the timing SET_2a in which the fuel injection pattern is set in the compression process in the second cylinder in which the compression process is performed next to the first cylinder. Moreover, the cylinder of interest in the embodiment, means a cylinder; which has the pressure sensor 40 and in which the cetane number estimating process is performed. Moreover, the period T2 in the embodiment, means a period; from immediately after the timing SET_2a in which the fuel injection pattern is set in the compression process in the second cylinder in which the compression process is performed next to the first cylinder corresponding to the cylinder of interest; to immediately before the timing SET_1b in which the fuel injection pattern is set in the compression process in a next cycle in the first cylinder.

(3-3) Principle of Estimating the Cetane Number, if F/C is started in the Period T1

Now, with reference to FIG. 4, an explanation will be given on the principle of estimating the cetane number, if F/C is started in the period T1.

Normally, if F/C is started, as long as special injection to estimate the cetane number is not set, while a request for normal injection is recovered after the start of F/C, the injection pattern is not set. In other words, in the example in FIG. 4, F/C is started in the period T1, and the timing SET_2a for the second cylinder is after the start of F/C, so that the injection is not set.

Therefore, in the exhaust process shown by (B) in FIG. 4, in the second cylinder, the non-combustion gas in which the fuel is not burned, is emitted at first immediately after F/C is started in the period T1. The emission of the non-combustion gas in the exhaust process shown by (B) in FIG. 4, is performed at substantially the same time as the intake process shown by (A) in FIG. 4, in the first cylinder. Thus, the most part of the emission of the non-combustion gas, is breathed into the first cylinder through the EGR passage (or EGR pipe).

As a result, if F/C is started in the period T1, the amount of oxygen in the cylinder or cylinders as the driving condition or operating condition immediately before the start of the cetane number estimating process; is relatively larger due to the non-combustion gas, in comparison with a case where F/C is started in the period T2 described later. Thus, it is found that the ignition timing is relatively earlier or faster.

(3-4) Principle of Estimating the Cetane Number, if F/C is Started in the Period T2

Now, with reference to FIG. 5, an explanation will be given on the principle of estimating the cetane number, if F/C is started in the period T2.

Normally, even during the request for F/C, the fuel injection is performed as the normal injection set before the start of the request for F/C. In other words, in the example in FIG. 5, F/C is started in the period T2, and the normal injection of the second cylinder set in the timing SET_2a before the start of F/C is performed in the timing INJ_2a.

Therefore, in the exhaust process shown by (B) in FIG. 5, in the second cylinder, the combustion gas in which the fuel is burnt, is emitted. The emission of the combustion gas in the exhaust process shown by (B) in FIG. 5, is performed at substantially the same time as the intake process shown by (A) in FIG. 5, in the first cylinder. Thus, the most part of the emission of the combustion gas is breathed into the first cylinder through the EGR passage (or EGR pipe). In other words, the intake of the non-combustion gas through the EGR passage (or EGR pipe) is hardly performed or is not performed at all in the intake process shown by (A) in FIG. 5, in the first cylinder.

As a result, if F/C is started in the period T2, the amount of oxygen in the cylinder or cylinders as the driving condition or operating condition immediately before the start of the cetane number estimating process, is relatively smaller due to the combustion gas, in comparison with the case where F/C is started in the period T1 described above. Thus, it is found that the ignition timing is relatively later or slower.

(3-5) Estimating Process Based on the Period in which F/C is Started

In the cetane number estimating method focusing on the amount of oxygen in the embodiment, the map indicating the correlation between the ignition timing and the cetane number to estimate the cetane number; is changed on the basis of the fact in which period, F/C is started, the period T1 or the period T2.

Specifically, if F/C is started in the period T1, as shown in the curve (a) in FIG. 3 described above, the map to define the first correlation in which the ignition timing IGT1 is relatively earlier or faster than the ignition timing IGT2, with respect to the fuel with the same cetane number CN1; is used to estimate the cetane number. This is because if F/C is started in the period T1, the amount of oxygen in the cylinder or cylinders as the driving condition or operating condition immediately before the start of the cetane number estimating process; is relatively larger due to the non-combustion gas, and the ignition timing is relatively earlier or faster, as described above.

On the other hand, if F/C is started in the period T2, as shown in a curve (b) in FIG. 3 described above, the map to define the second correlation in which the ignition timing IGT2 is relatively later or slower than the ignition timing IGT1, with respect to the fuel with the same cetane number CN1; is used to estimate the cetane number. This is because if F/C is started in the period T2, the amount of oxygen in the cylinder or cylinders as the driving condition or operating condition immediately before the start of the cetane number estimating process; is relatively littler or smaller due to combustion gas, and the ignition timing is relatively later or slower, as described above.

As described above, in the cetane number estimating method focusing on the amount of oxygen in the embodiment, the oxygen in the cylinder or cylinders as the driving condition or operating condition, which is a significant factor in variation in the measured ignition timing, is quantitatively or qualitatively recognized. Then along with this recognition, the map indicating the correlation between the ignition timing and the cetane number to estimate the cetane number, is changed.

As a result, it is possible to estimate the cetane number, highly accurately and quickly, in consideration of the change in the driving condition or operating condition of the internal combustion engine in the various processes (or various cycles) immediately after F/C is performed. In particular, as in the AT vehicle (Automatic Transmission vehicle), in the case where the time period of F/C during deceleration is set to be extremely shorter than the case of the normal vehicle, it is possible to estimate the cetane number, highly accurately and quickly, in consideration of the change in the driving condition or operating condition of the internal combustion engine.

(4) Another Embodiment

Next, a cetane number estimating process in another embodiment, will be explained. Incidentally, with regard to the constituent elements in the other embodiment, substantially the same constituent elements as those in the aforementioned embodiment will carry the same referential numerical, and the explanation thereof will be omitted, as occasion demands.

(4-1) Fuel Cetane Number Estimating Process

Next, with reference to FIG. 6, an explanation will be given on the cetane number estimating process in the other embodiment. Here, FIG. 6 is a flowchart showing a flow of the cetane number estimating process in the other embodiment. Incidentally, the cetane number estimating process is repeatedly performed by the ECU 20 with a predetermined period such as several tens milliseconds and several milliseconds. Incidentally, in the estimating process in the other embodiment, substantially the same operations and processes as those in the aforementioned embodiment will carry the same referential numerical, and the explanation thereof will be omitted as occasion demands.

As shown in FIG. 6, after the aforementioned step S101 and step S102, if the estimation of the cetane number is unperformed, i.e. if the estimation of the cetane number has not been performed and needs to be performed (the step S102: Yes), it is further judged whether or not the currently targeted cylinder is the cylinder of interest, under the control of the ECU 20 (step S201). The cylinder of interest in the other embodiment, means a cylinder; which has the pressure sensor 40 and in which the cetane number estimating process is performed, as described above.

As a result of the judgment in the step S201, if the currently targeted cylinder is the cylinder of interest (the step S201: Yes), the fuel to estimate the cetane number, is injected by the injector 30, under the control of the ECU 20 (step S202).

Then, under the control of the ECU 20, the ignition timing of fuel is actually measured by the pressure sensor 40, and the measured value is substituted for the variable IGT (step S203).

Then, under the control of the ECU 20, the cetane number is estimated on the basis of a map "map_ (IGT, count)" to define a third correlation in which ignition timing IGT3 is delayed as a count "count" corresponding to the frequency of the emission of the non-combustion gas, is increased (step S204). Incidentally, the details of the map "map_ (IGT, count)" to estimate the cetane number, will be described later.

On the other hand, as a result of the judgment in the step S201, if the currently targeted cylinder is not the cylinder of interest (the step S201: No), the counter variable is incremented by "1", under the control of the ECU 20 (step S205).

Then, under the control of the ECU 20, normal F/C in which the cetane number does not have to be estimated, is performed in order to limit or reduce the fuel consumption (step S206).

(4-2) Principle of Estimating the Cetane Number Focusing on Amount of Heat Received Next, with reference to FIG. 7 and FIG. 8, an explanation will be given on a map to estimate the cetane number focusing on the amount of heat received, in the other embodiment. FIG. 7 is a map to define the third correlation among the frequency of a non-combustion cycle, the cetane number, and the ignition timing, in the other embodiment. FIG. 8 are a schematic diagram schematically showing the process timing of four cylinders, if the frequency of emission of non-combustion gas is relatively lower or smaller (FIG. 8(*a*)), and a schematic diagram schematically showing the process timing of four cylinders, if the frequency of emission of non-combustion gas is relatively higher or bigger (FIG. 8(*b*)), in the other embodiment.

The cetane number estimating method focusing on the amount of heat received by the internal combustion engine such as a cylinder head, is, in other words, a method of estimating the cetane number on the basis of the frequency of a non-combustion cycle (i.e. a non-combustion process) in which combustion is not performed, in all the cylinders, until the fuel to estimate the cetane number is injected in a predetermined injection pattern. In other words, the cetane number is estimated on the basis of the map to define the third correlation among the frequency of the non-combustion cycle in which the combustion is not performed, the cetane number, and the ignition timing, in all the cylinders, until the fuel to estimate the cetane number is injected in the predetermined injection pattern.

As shown in FIG. 7, the map to define the third correlation specifically indicates a correlation in which as the non-combustion cycle (i.e. the non-combustion process) is less frequent (i.e. as the emission of the non-combustion gas is less frequent), the cetane number is increased, and the ignition timing is earlier or faster. Incidentally, the size of a circle in FIG. 7 indicates the extent of the ignition timing. As the size of the circle is larger, the delayed time of the ignition timing is larger; namely, the ignition timing is later or slower. On the other hand, as the size of the circle in FIG. 7 is smaller, the delayed time of the ignition timing is smaller; namely, the ignition timing is earlier or faster. This is because as the emission of the non-combustion gas is less frequent as described above, i.e. as the emission of the combustion gas is more frequent, the amount of heat received by the cylinder or the like as the driving condition or operating condition immediately before the start of the cetane number estimating process, is larger due to the emission of the combustion gas which is relatively frequent, and the ignition timing is earlier or faster.

More specifically, as shown in FIG. 8(*a*), if F/C is started in a period T3, it is one cycle, e.g., CNT#1 in FIG. 8(*a*), that the non-combustion gas is emitted before the injection pattern to estimate the cetane number, is set in the first cylinder in the timing SET_1*b*, and the frequency of emission of the non-combustion gas is relatively lower or smaller. Here, the period T3 indicates a period; from injection set timing SET_3a of the third cylinder; to injection set timing SET_4a of the fourth cylinder, wherein the cylinder of interest is the first cylinder, and the other cylinders are the second, third, and fourth cylinders in order of the implementation of the compression process. In other words, the frequency of emission of the combustion gas is relatively higher, so that it is predicted that; the amount of heat received by the cylinder head or the like is larger due to the emission of the combustion gas which is relatively more frequent; and that the ignition timing is earlier or faster. Therefore, the cetane number is estimated by using one portion of the map to define the third correlation between the cetane number and the ignition timing, corresponding to the case where the frequency of emission of the non-combustion gas is relatively lower.

In other words, as shown in FIG. 7, the map to define the third correlation specifically indicates a correlation in which as the non-combustion cycle (i.e. the non-combustion process) is more frequent (i.e. as the emission of the non-combustion gas is more frequent), the cetane number is reduced, and the ignition timing is later or slower, as shown in FIG. 7. This is because as the emission of the non-combustion gas is more frequent as described above, i.e. as the emission of the combustion gas is less frequent, the amount of heat received by the cylinder or the like as the driving condition or operating condition immediately before the start of the cetane number estimating process, is smaller due to the emission of the combustion gas which is relatively less frequent, and the ignition timing is later or slower.

More specifically, as shown in FIG. 8(b), if F/C is started in the period T1, it is three cycles, e.g., CNT#1, CNT#2 and CNT#3 in FIG. 8(b), that the non-combustion gas is emitted before the injection pattern to estimate the cetane number, is set in the first cylinder in the timing SET_1b, and the frequency of emission of the non-combustion gas is relatively higher. Here, the period T1 indicates a period; from the injection set timing SET_1a of the first cylinder; to the injection set timing SET_2a of the second cylinder, wherein the cylinder of interest is the first cylinder, and the other cylinders are the second, third, and fourth cylinders in order of the implementation of the compression process. In other words, the emission of the combustion gas is less frequent, so that it is predicted; that the amount of heat received by the cylinder head or the like is small due to the emission of the combustion gas which is relatively less frequent; and that the ignition timing is later or slower. Therefore, the cetane number is estimated by using another portion of the map to define the third correlation between the cetane number and the ignition timing, corresponding to the case where the frequency of emission of the non-combustion gas is relatively higher.

As described above, in the cetane number estimating method focusing on the amount of heat received by the internal combustion engine such as the cylinder head in the other embodiment, the cetane number is estimated on the basis of the map to define the third correlation among the frequency of the non-combustion cycle (i.e. the non-combustion process), the cetane number, and the ignition timing, in order to quantitatively or qualitatively recognize thermal energy received by the internal combustion engine as the driving condition or operating condition which is a significant factor in variation in the measured ignition timing.

As a result, it is possible to estimate the cetane number, highly accurately and quickly, in consideration of the change in the driving condition or operating condition of the internal combustion engine in the various processes (or various cycles) immediately after F/C is performed. In particular, as in the AT vehicle (Automatic Transmission vehicle), in the case where the time period of F/C during deceleration is set to be extremely shorter than the case of the normal vehicle, it is possible to estimate the cetane number, highly accurately and quickly, in consideration of the change in the driving condition or operating condition of the internal combustion engine.

Incidentally, in the cetane number estimating method focusing on the amount of heat received by the internal combustion engine such as the cylinder head in the other embodiment, if the map to estimate the cetane number focusing on the amount of oxygen in the cylinders in the aforementioned embodiment is considered, it is possible to estimate the cetane number more highly accurately in consideration of the change in the driving condition or operating condition of the internal combustion engine.

In the aforementioned embodiments, as the device to estimate the cetane number in consideration of the driving condition or operating condition, the map to define the correlation among the frequency of the non-combustion cycle, the cetane number, and the ignition timing was explained in addition to the plurality of types of maps to define the correlation between the cetane number and the ignition timing, corresponding to the driving condition or operating condition of the internal combustion engine. However, in addition to or in replace of the above explained map, a function or equation model in which the driving condition or operating condition is quantitatively or qualitatively considered, may be adopted in a theoretical, experimental, experiential, or simulation manner.

The present invention is not limited to the aforementioned embodiments, but various changes may be made, if desired, without departing from the essence or spirit of the invention which can be read from the claims and the entire specification. A cetane number estimating apparatus and method, which involve such changes, are also intended to be within the technical scope of the present invention.

INDUSTRIAL APPLICABILITY

The cetane number estimating apparatus and method of the present invention can be applied to a cetane number estimating apparatus and method for estimating the cetane number of fuel in an internal combustion engine such as a diesel engine.

The invention claimed is:

1. A cetane number estimating apparatus comprising:
a plurality of cylinders provided for an internal combustion engine which can re-circulate one portion of exhaust gas from an exhaust system to an intake system;
an injecting device for injecting fuel into the cylinders;
a measuring device for measuring ignition timing in the cylinders on the basis of a change in pressure in the cylinders;
a judging device for judging whether or not the fuel is burnt in another cylinder which is in an exhaust process when one cylinder is in an intake process; and
an estimating device for estimating the cetane number of the injected fuel on the basis of the measured ignition timing and a first correlation between the cetane number and the ignition timing corresponding to a case where non-combustion gas in which the fuel is not burnt is emitted by said another cylinder, when the one cylinder is in the intake process, if it is judged that the fuel is not burnt in said another cylinder;
and for estimating the cetane number of the injected fuel on the basis of the measured ignition timing and a second correlation between the cetane number and the ignition timing corresponding to a case where combustion gas in which the fuel is burnt is emitted by said another cylinder, when the one cylinder is in the intake process, if it is judged that the fuel is burnt in said another cylinder.

2. The cetane number estimating apparatus according to claim 1, wherein the first correlation defines the ignition timing which is relatively earlier with respect to one cetane number, and the second correlation defines the ignition timing which is relatively later with respect to the one cetane number.

3. The cetane number estimating apparatus according to claim 1, wherein the estimating device estimates the cetane number on the basis of the first correlation, if fuel cut is performed in a first period which is a time interval; from timing of a first compression process in the one cylinder; to timing of a second compression process in said another cylinder which performs the second compression process next to the one cylinder.

4. The cetane number estimating apparatus according to claim 1, wherein the estimating device estimates the cetane number on the basis of the second correlation, if fuel cut is performed in a second period which is a time interval; from timing of a second compression process in said another cylinder which performs the second compression process next to a first compression process in the one cylinder; to timing of a third compression process performed next to the first compression process in the one cylinder.

5. The cetane number estimating apparatus according to claim 1, wherein the estimating device further estimates the cetane number on the basis of a third correlation among the cetane number, the ignition timing, and frequency of emission of non-combustion gas in which the fuel is not burnt, in the plurality of cylinders.

6. The cetane number estimating apparatus according to claim 5, wherein the third correlation is defined such that the ignition timing becomes later as the emission of the non-combustion gas is more frequent.

7. A cetane number estimating apparatus comprising:

a plurality of cylinders provided for an internal combustion engine;

an injecting device for injecting fuel into the cylinders;

a measuring device for measuring ignition timing in the cylinders on the basis of a change in pressure in the cylinders; and an estimating device for estimating the cetane number of the injected fuel on the basis of the measured ignition timing in addition to a third correlation among the cetane number, the ignition timing, and frequency of emission of non-combustion gas in which the fuel is not burnt, in the plurality of cylinders.

8. A cetane number estimating method comprising:

an injecting process of injecting fuel into a plurality of cylinders provided for an internal combustion engine which can re-circulate one portion of exhaust gas from an exhaust system to an intake system;

a measuring process of measuring ignition timing in the cylinders on the basis of a change in pressure in the cylinders;

a judging process of judging whether or not the fuel is burnt in another cylinder which is in an exhaust process when one cylinder is in an intake process; and an estimating process of estimating the cetane number of the injected fuel on the basis of the measured ignition timing and a first correlation between the cetane number and the ignition timing corresponding to a case where non-combustion gas in which the fuel is not burnt is emitted by said another cylinder, when the one cylinder is in the intake process, if it is judged that the fuel is not burnt in said another cylinder;

and of estimating the cetane number of the injected fuel on the basis of the measured ignition timing and a second correlation between the cetane number and the ignition timing corresponding to a case where combustion gas in which the fuel is burnt is emitted by said another cylinder, when the one cylinder is in the intake process, if it is judged that the fuel is burnt in said another cylinder.

9. A cetane number estimating method comprising:

an injecting process of injecting fuel into a plurality of cylinders provided for an internal combustion engine;

a measuring process of measuring ignition timing in the cylinders on the basis of a change in pressure in the cylinders; and an estimating process of estimating the cetane number of the injected fuel on the basis of the measured ignition timing in addition to a third correlation among the cetane number, the ignition timing, and frequency of emission of non-combustion gas in which the fuel is not burnt, in the plurality of cylinders.

* * * * *